US012646111B2

(12) United States Patent
Mercer et al.

(10) Patent No.: US 12,646,111 B2
(45) Date of Patent: Jun. 2, 2026

(54) SYSTEM AND METHOD FOR EXECUTING SYNCHRONIZED MESSAGES IN MULTIPLE GEOGRAPHICALLY DISTRIBUTED SERVERS

(71) Applicant: RENAISSANCE TECHNOLOGIES LLC, New York, NY (US)

(72) Inventors: Robert L. Mercer, East Setauket, NY (US); Peter F. Brown, East Setauket, NY (US)

( * ) Notice: Subject to any disclaimer, the term of this patent is extended or adjusted under 35 U.S.C. 154(b) by 0 days.

(21) Appl. No.: 17/497,568

(22) Filed: Oct. 8, 2021

(65) Prior Publication Data

US 2022/0076337 A1     Mar. 10, 2022

Related U.S. Application Data

(62) Division of application No. 14/451,356, filed on Aug. 4, 2014, now Pat. No. 11,157,998.

(51) Int. Cl.
G06Q 40/04          (2012.01)
(52) U.S. Cl.
CPC .................................... G06Q 40/04 (2013.01)
(58) Field of Classification Search
CPC .............................. G06Q 40/06; G06Q 40/04
See application file for complete search history.

(56) References Cited

U.S. PATENT DOCUMENTS 5,887,143 A     3/1999  Saito et al.
8,489,747 B2    7/2013  Aisen et al.

2006/0161494 A1    7/2006   Littlewood
2007/0087791 A1    4/2007   Feeney
2010/0228644 A1    9/2010   Schluetter
2010/0332650 A1*  12/2010   Aisen .................. H04L 43/0852
                                                              709/224
2011/0040997 A1    2/2011   Baumgartl et al.
2011/0196778 A1    8/2011   Vinokour
2011/0213700 A1    9/2011   Sant'Anselmo
(Continued)

FOREIGN PATENT DOCUMENTS

JP          2013-513171 A      6/2010
WO      WO2011069234 A1      6/2011
WO      WO2014043420 A1      3/2014

OTHER PUBLICATIONS

Hedge Fund Renaissance Loses Bid to Patent Speedy Algorithm, Bloomberg Law News (Year: 2021).*

(Continued)

*Primary Examiner* — Arunava Chakravarti

(57)          ABSTRACT

A geographically distributed computer system that includes a primary server, and multiple secondary servers co-located with geographically dispersed tertiary servers. Each of the secondary servers having a high accuracy clock. The primary server divides a large message order into multiple smaller messages and combines each smaller message with a transaction execution time into multiple instructions. The primary server sends a respective instruction based on each combined smaller message and transaction execution time to each co-located server. When the high accuracy clock on each server reaches the transaction execution time, all the co-located servers submit their smaller messages to their respective co-located tertiary server substantially simultaneously.

26 Claims, 6 Drawing Sheets

(56) References Cited

U.S. PATENT DOCUMENTS

| | | |
|---|---|---|
| 2013/0110700 A1 | 5/2013 | Schluetter |
| 2013/0211991 A1 | 8/2013 | Patel |
| 2013/0304626 A1 | 11/2013 | Aisen et al. |
| 2013/0318146 A1* | 11/2013 | Kanthak ................. H04L 67/10 |
| | | 709/201 |
| 2014/0003199 A1* | 1/2014 | Dougan ................ H04J 3/0641 |
| | | 368/46 |

OTHER PUBLICATIONS

Quant Giant Hits Snag With Bid to Protect Speedy Algorithm, Bloomberg Law News (Year: 2021).*
Jacob Loveless, Barbarians at the Gateways, ACMQueue, Oct. 16, 2013 (Year: 2013).

* cited by examiner

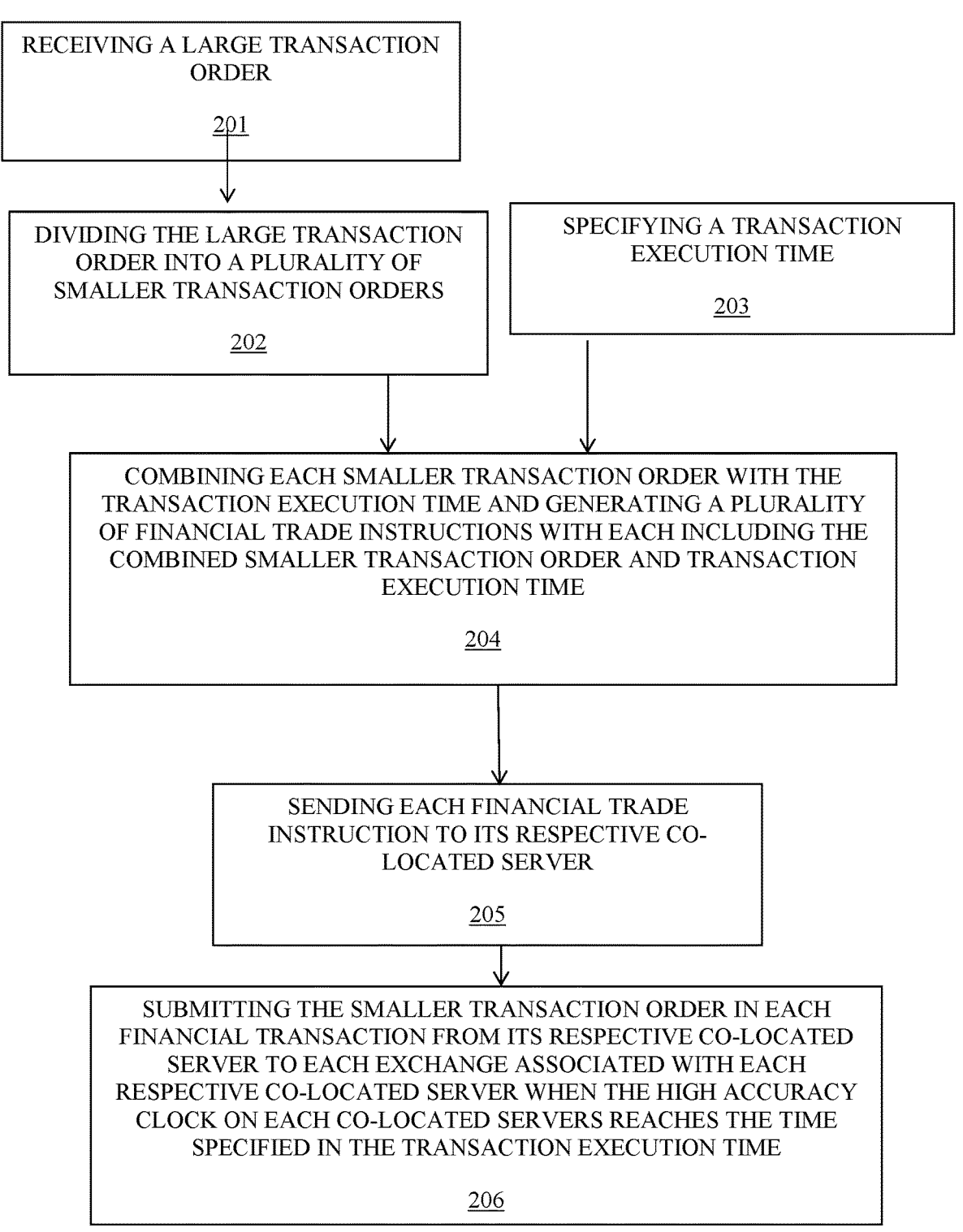

RECEIVING A LARGE TRANSACTION ORDER

201

DIVIDING THE LARGE TRANSACTION ORDER INTO A PLURALITY OF SMALLER TRANSACTION ORDERS

202

SPECIFYING A TRANSACTION EXECUTION TIME

203

COMBINING EACH SMALLER TRANSACTION ORDER WITH THE TRANSACTION EXECUTION TIME AND GENERATING A PLURALITY OF FINANCIAL TRADE INSTRUCTIONS WITH EACH INCLUDING THE COMBINED SMALLER TRANSACTION ORDER AND TRANSACTION EXECUTION TIME

204

SENDING EACH FINANCIAL TRADE INSTRUCTION TO ITS RESPECTIVE CO-LOCATED SERVER

205

SUBMITTING THE SMALLER TRANSACTION ORDER IN EACH FINANCIAL TRANSACTION FROM ITS RESPECTIVE CO-LOCATED SERVER TO EACH EXCHANGE ASSOCIATED WITH EACH RESPECTIVE CO-LOCATED SERVER WHEN THE HIGH ACCURACY CLOCK ON EACH CO-LOCATED SERVERS REACHES THE TIME SPECIFIED IN THE TRANSACTION EXECUTION TIME

SYSTEM AND METHOD FOR EXECUTING SYNCHRONIZED MESSAGES IN MULTIPLE GEOGRAPHICALLY DISTRIBUTED SERVERS

CROSS REFERENCE TO RELATED APPLICATIONS

The present application claims priority under 35 U.S.C. 121 to, and is a divisional application of U.S. Ser. No. 14/451,356 filed Aug. 4, 2014. The content of the prior application is expressly incorporated herein by reference thereto.

FIELD OF THE INVENTION

The invention relates to financial trading systems and trading methods utilizing the same. More particularly, the invention relates to financial trading systems and trading methods capable of executing time synchronized trades in multiple exchanges.

BACKGROUND OF THE INVENTION

High frequency trading ("HFT") is an automated trading platform used by large investment banks, hedge funds, and institutional investors that utilizes powerful computers and high speed communication links to transact a large number of financial instrument orders at extremely high speeds. These high frequency trading platforms use complex algorithms to analyze multiple markets and financial exchanges, and allow the traders to execute a great number of orders in a matter of seconds or fractions of a second based on that analysis. For example, when a non-high frequency trader is contemplating a large order that cannot be filled cost-effectively by a single stock exchange, the trader can divide the large order into smaller orders that are then routed to multiple, different stock exchanges. Although transmitted at the same time from the trader's system, these smaller orders may arrive at their destination exchanges faster or slower than the other smaller orders because of the different distances to the different exchanges and the different latencies and congestion of the communication links/networks used for communication with the exchanges. Thus each of the smaller orders will be executed by the different exchanges at different times.

When orders begin to show on the books of the faster exchanges, institutions that implement high frequency trading can detect the orders at the faster exchanges and take advantage of the slower exchanges by purchasing the financial instruments of the smaller orders at the slower exchanges and selling those instruments at a higher price to the non-high frequency trader when its smaller orders for those instruments arrive. Thus, by anticipating and beating the trends in the marketplace using sophisticated technological tools and computer algorithms, high frequency traders can gain favorable returns by beating the non-high frequency traders to the slower exchanges.

To counteract this predatory practice, techniques have been developed to have all of the divided smaller orders arrive at their respective exchanges at approximately the same time by intentionally delaying the smaller orders to the faster exchanges. One technique, as shown in FIG. 1, is coiling several miles long of fiber-optic cable and placing it in a small compartment to simulate the effects of distance and create a slight time delay in the delivery of orders to the faster exchanges. Another technique, as shown in FIGS. 2A and 2B, is determining the time delays to the exchanges and the latencies of the communications links/networks and the exchanges based on prior orders submitted to the exchanges. This data is used to determine predicted time delays associated with executing orders on each of the exchanges. For new large orders that are broken up into smaller orders, the trader's system uses the predicted time delays in transmitting the smaller orders to simultaneously deliver the smaller orders to the exchanges. Yet another technique, as shown in FIG. 3, employs a management infrastructure which receives and routes orders from different trading entities at a server via a transmission medium to create a certain amount of transmission delay before the orders arrive at the exchanges. All these techniques, however, have several drawbacks.

The first technique requires calculating the distance necessary to achieve the desired time delay and utilizing prolonged, expensive, and bulky fiber-optic cable. The second technique requires designing and utilizing sophisticated hardware and software to determine the time delay and latency, which complicate and increase the cost of implementation. Further, the determined time delay is only an average and thus a prediction of what the delay of an order might be at any given time in the future. The actual delay of a particular order can be considerably and unpredictably affected by such things as the congestion on the communication network at the time the order is actually transmitted. The third technique requires first sending and delaying the orders at a server before routing them to the exchanges, which increases the overall order delivery and processing time. Moreover, since the server is responsible for routing all the orders to all the exchanges, the orders will not be submitted to some or all the exchanges if the server malfunctions. Furthermore, all these techniques suffer from inability to overcome changes in latency caused by network traffic, data routing, outages, and the like.

Accordingly, there remains a need for an improved financial trading system and a trading method utilizing the same that overcome the deficiencies of the prior art.

SUMMARY OF THE INVENTION

One embodiment of the present invention is a computer-based method configured and adapted to execute synchronized financial trading in an electronic trading environment that includes a plurality of financial exchanges. The method comprises acts of storing, by a trading server, a large transaction order; dividing, by the trading server, the large transaction order into a plurality of smaller transaction orders; determining, by the trading server, a transaction execution time at which the plurality of smaller transaction orders are to be submitted for execution; generating, by the trading server, a plurality of financial trade instructions, each of the plurality of financial trade instructions containing a respective one of the smaller transaction orders and the transaction execution time; transmitting, by the trading server, each of the plurality of financial trade instructions to a respective one of a plurality of co-located servers, the plurality of co-located servers being co-located at financial exchanges where respective smaller transaction orders are to be executed; storing, by each of the plurality of co-located servers, the respective smaller transaction order and the transaction execution time contained in the transmitted respective financial trade instruction; determining, by each of the plurality of co-located servers, a current time; and comparing, by each of the plurality of co-located servers, the determined current time and the stored transaction execution time, and when the determined current time is equal to the stored transaction execution time, each of the plurality of co-located servers submitting the stored smaller transaction order to the financial exchange where it is co-located, whereby the plurality of smaller transaction orders are received at their respective exchanges substantially simultaneously.

Another embodiment of the present invention is a computer-based system for executing synchronized financial trading in an electronic trading environment that includes a plurality of financial exchanges. The system comprises control circuitry that controls operation of the system; a plurality of co-located servers with each being co-located at a respective one of the plurality of financial exchanges and being connected to the respective one of the plurality of financial exchanges; a trading server operated by a trading entity, the trading server being connected to the plurality of co-located servers; and wherein the control circuitry is operable to store, by the trading server, a large transaction order; divide, by the trading server, the large transaction order into a plurality of smaller transaction orders; determine, by the trading server, a transaction execution time at which the plurality of smaller transaction orders are to be submitted for execution; generate, by the trading server, a plurality of financial trade instructions, each of the plurality of financial trade instructions containing a respective one of the smaller transaction orders and the transaction execution time; transmit, by the trading server, each of the plurality of financial trade instructions to a respective one of the plurality of co-located servers; store, by each of the plurality of co-located servers, the respective smaller transaction order and the transaction execution time contained in the transmitted respective financial trade instruction; determine, by each of the plurality of co-located servers, a current time; and compare, by each of the plurality of co-located servers, the determined current time and the stored transaction execution time, and when the determined current time is equal to the stored transaction execution time, each of the plurality of co-located servers submits the stored smaller transaction order to the financial exchange where it is co-located, whereby the plurality of smaller transaction orders are received at their respective exchanges substantially simultaneously.

Another embodiment of the present invention is a computer-based system for executing synchronized financial trading in an electronic trading environment that includes a plurality of financial exchanges comprising control circuitry that controls operation of the system; a trading server operated by a trading entity; and wherein the control circuitry is operable to store, by the trading server, a large transaction order; divide, by the trading server, the large transaction order into a plurality of smaller transaction orders; determine, by the trading server, a transaction execution time at which the plurality of smaller transaction orders are to be submitted to their respective financial exchanges for execution; and generate, by the trading server, a plurality of financial trade instructions, each of the plurality of financial trade instructions containing a respective one of the smaller transaction orders and the transaction execution time.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 5 depicts a trading method according to an embodiment of the present invention.

DETAILED DESCRIPTION OF THE INVENTION

Figure 4:
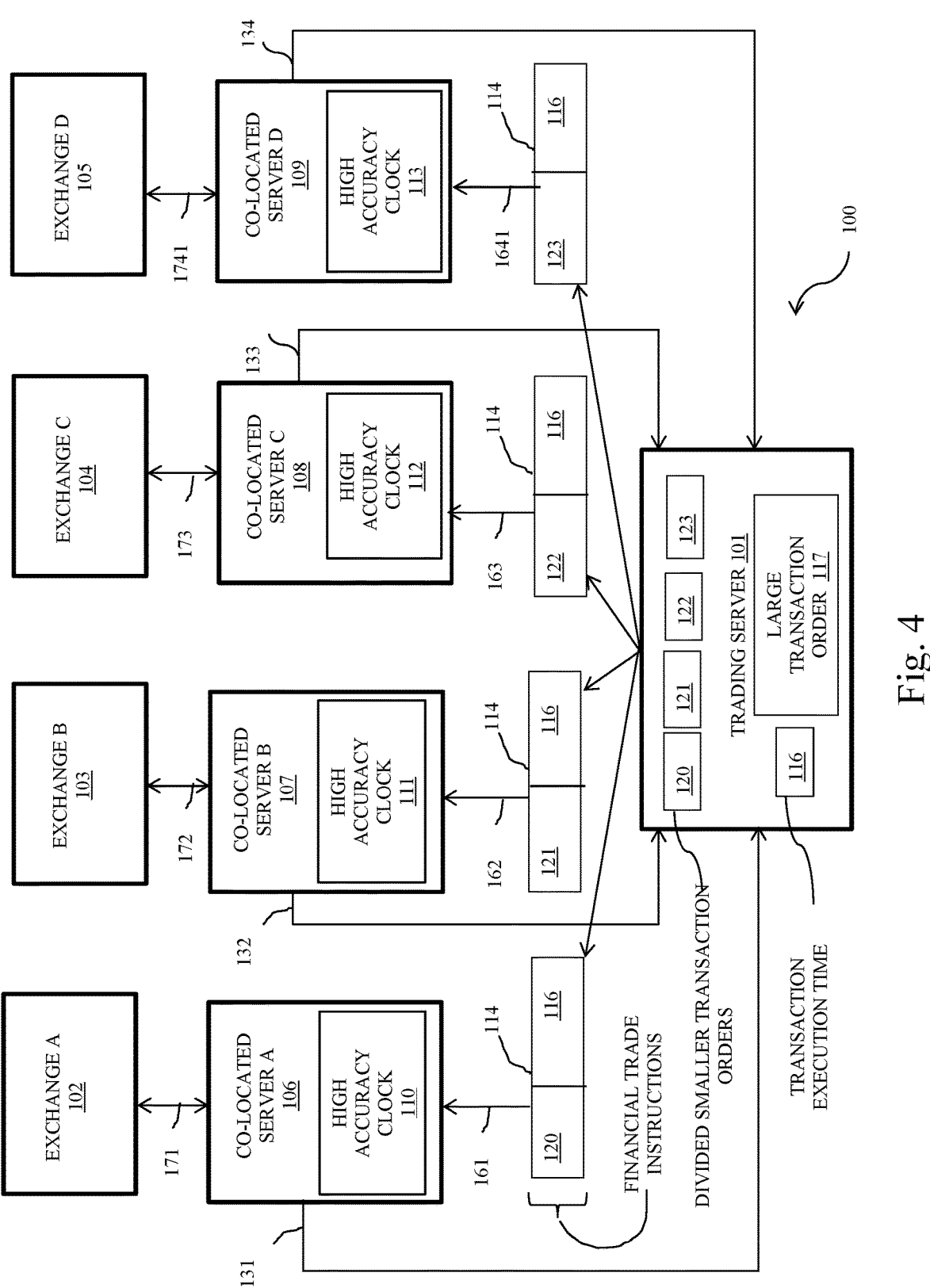
FIG. 4 illustrates one embodiment of the financial trading system of the present invention.

Referring to FIG. 4, one embodiment of the financial trading system 100 is illustrated. The financial trading system 100 comprises a trading server 101, multiple financial exchanges 102, 103, 104, 105, and multiple servers 106, 107, 108, 109, each associated with a respective exchange and comprising a high accuracy clock 110, 111, 112, 113. The trading entity that operates the trading server 101 may be a non-high frequency trader or a trader with a transmittal or communication speed to the exchanges 102, 103, 104, 105 slower than that of a high frequency trader. The trading entity operates the trading server 101 to communicate with the multiple servers 106, 107, 108 109. The detailed structure of trading server 101 is discussed below. The multiple exchanges 102, 103, 104, 105 may be, for example, NASDAQ, NYSE, BATS, Direct Edge, Euronext, ASX, and/or the like. Each of the multiple servers 106, 107, 108, 109 may include hardware and software to receive a financial trade instruction 114 from the trading server 101 and to work with high accuracy clocks 110, 111, 112, 113. The multiple servers 106, 107, 108, 109 may be provided by the exchanges 102, 103, 104, 105 or the trading entity, and placed at the same site where the exchange is located (that is, co-located with the exchange) or at an area in close proximity to the exchange such that the communication speed to and the latencies of the exchanges 102, 103, 104, 105 are negligible.

Trading server 101 is connected to the multiple servers 106, 107, 108 109 via first communication links 161-164 and the multiple servers 106, 107, 108 109 are connected to their respective exchanges via second communication links 171-174. Either or both of the first communication link 161-164 and the second communication link 171-174 may be wireless, such as through local computer networks, e.g., IEEE 802.11 (WLAN), IEEE 802.15 (WPAN), and IEEE 802.15.4 (LR-WPAN), radio frequency systems, e.g., 900 MHz, 1.4 GHz, and 5.6 GHz communication systems, infrared, GSM, GSM plus EDGE, CDMA, quadband, and other cellular protocols. Alternatively, either or both of the first and second communication links may be wired, such as by optic fibers, Ethernet cables, twisted pair cables, coaxial cables, telecommunications lines, or similar wired protocols. In a preferred embodiment, the first communication links 161-164 are telecommunications lines and the second communication links 171-174 are local computer networks.

The co-located servers 106, 107, 108, 109 are preferably the property of the trading entity, to enable the trading entity, via the trading server 101, to control the speed and integrity of the co-located servers 106, 107, 108, 109. But optionally, the co-located servers 106, 107, 108, 109 can be the property of the exchanges 102, 103, 104, 105 and leased for use and control by the trading entity 101. In either embodiment, whether owned or leased, the trading entity preferably exercises exclusive control over the co-located servers 106, 107, 108, 109. As appreciated by those skilled in the art, other trading entities can also have their own co-located servers.

The high accuracy clocks 110, 111, 112, 113 in the co-located servers 106, 107, 108, 109 provide a current time measurable to microsecond accuracy. They may be atomic clocks, optical clocks, quantum clocks, Global Position System (GPS) clocks, or any clock capable of measuring time accurate within microseconds from the time measured by National Institute of Standards and Technology (NIST). Each of the high accuracy clocks 110, 111, 112, 113 must have the capability of periodically synchronizing itself to the time broadcast by NIST. A GPS clock is one that includes a receiver that receives multiple time signals from multiple GPS satellites or similar terrestrial sources. The time supplied by each GPS signal is an estimate because of the effects inherent in radio propagation and ionospheric spread and delay. Thus, GPS clocks typically average the supplied time from each GPS satellite and the delays caused by these phenomena over several periods to provide a very accurate time. Despite these influences, a GPS clock is accurate within nanoseconds and the time differences among the GPS clocks, when a plurality of GPS clocks are employed on the co-located servers, are too small to be perceived by high frequency traders.

The present invention also permits using clocks that are not continuously connected to GPS satellites or other terrestrial sources as long as they provide time accurate within microseconds from the time measured by NIST and they have the ability to periodically synchronize with or receive updates from GPS satellites or some other terrestrial sources that carry the NIST atomic clock time. The synching or updating ability allows the clocks to check the accuracy of the time they are keeping and make adjustments as necessary.

The financial trade instructions 114 may comprise a section 120-123 carrying data representing a smaller transaction order for trading a financial instrument at a particular exchange and another section 116 carrying data representing a transaction execution time for submitting that order to that particular exchange. The financial instrument may be stocks, bonds, options, contract interests, currencies, loans, commodities, or other similar financial interests. The smaller transaction orders 120-123 are orders obtained by dividing a large transaction order 117 received from a customer of the trading entity or are generated by trading entity for trading on its own behalf. The order, whether it is a divided smaller transaction order 120-123 or a large transaction order 117, includes at least the number of financial instrument units or shares, such as 500 shares, that the customer or the trading entity wants to trade. The transaction execution time 116 is preferably generated by the trading server 101 and represents the precise time, e.g., 2 p.m. EST, that each of the smaller transaction orders 120-123 is to be submitted to its respective exchange. Alternatively, the transaction execution time 116 can define a small amount of time past a certain time, such as 2 p.m. EST+50 microseconds. The small amount of time is preferably several microseconds. The transaction execution time 116 accompanies each smaller transaction order 120-123 and together they are transmitted as the instruction 114 from the trading server 101 to each co-located server 106, 107, 108, 109.

Referring to FIGS. 4 and 5 collectively, one embodiment of the trading method of the financial trading system 100 is illustrated. When the trading entity, via the trading server 101, receives or generates a large transaction order 117 that cannot be fulfilled by one single financial exchange (step 201), the trading entity, either manually or automatically, via trading server 101, divides the large transaction order 117 into multiple smaller transaction orders 120-123 (step 202). The multiple smaller transaction orders 120-123 may be evenly or unevenly divided. Each smaller transaction order 120-123 is structured into a format that is acceptable to its respective exchange where the specific smaller transaction order 120-123 is eventually to be executed.

The transaction execution time 116 may be specified prior to receiving or generating the large transaction order 117, after the large transaction order 117 has been received or generated but before it is divided, or after the large transaction order 117 has been divided into the smaller transaction orders 120-123 (step 203). For example, instructions from a customer that include the large transaction order 117 may also include the instruction to execute the smaller transactions at time X. Alternatively, the trading server 101 may have preexisting instructions to execute the large transaction order 117 as soon as practical. In this alternative, the trading server would independently determine the transaction execution time 116, taking into account the time it will take to divide the large transaction order 117 into the smaller transaction orders 120-123, the time for transmitting the smaller transaction orders 120-123 to their respective co-located servers 106-109, and the time for the respective co-located servers 106-109 to prepare the order for simultaneous submission to the exchanges. Although some of these times may be variable, unlike the systems and methods of the prior art, the present invention is able to fully account for these variables and set a transaction execution time 116 that will insure that each of the financial orders is submitted to the respective exchanges substantially simultaneously. The term "substantially" is used to recognize that there might be slight differences, e.g., nanoseconds, in the times at which the orders are submitted by the co-located servers 106-109. However, the differences in submission times, if any, are undetectable by any system external to the exchange, e.g., high frequency traders.

After obtaining both the divided smaller transaction orders 120-123 and the transaction execution time 116, the trading server 101 generates a plurality of financial trade instructions 114 by combining each smaller transaction order 120-123 with the transaction execution time 116 (step 204) and then sends each generated financial trade instruction 114 to its respective co-located server 106, 107, 108, 109 located on the same site as the respective exchange 102, 103, 104, 105 or at an area in close proximity to the respective exchange 102, 103, 104, 105 (step 205). The plurality of financial trade instructions 114 may be sent from the trading server 101 at the same time or at different times as long as they are received before the time specified in the transaction execution time 116 and are provided with sufficient time for the co-located servers 106-109 to transmit the transaction orders 120-123 to their respective exchange 102-105.

Upon receipt by its respective co-located server 106-109, each financial trade instruction 114 is unpacked to separate the transaction order 120-123 and the transaction execution time 116. Only the transaction order 120-123 is submitted to the respective exchange by the corresponding co-located server 106-109. The transaction execution time 116 is used by the co-located servers 106-109 to know when they should submit their respective transaction orders 120-123 to the exchanges. Each of the transaction orders 120-123 stays at its corresponding server 106-109 and no purchase or sale is transmitted to an exchange 102-105 until the time of the high accuracy clock 110, 111, 112, 113 on the server 106-109 reaches the time specified in the transaction execution time 116.

The multiple servers 106, 107, 108, 109 are preferably controlled exclusively by the trading entity. This way, the trading entity, via trading server 101, can directly monitor the transmissions of the financial trade instructions 114 to the multiple servers 106, 107, 108, 109 and provide instructions to the multiple servers 106, 107, 108, 109 if necessary. Monitoring can ensure receipt of the financial trade instructions 114 at the multiple servers 106, 107, 108, 109 and that the number of the smaller transaction order 120-123, such as 500 shares, and the transaction execution time 116 are still correct after the transmission. Instructions may allow the trading server 101 using the multiple servers 106, 107, 108, 109 to halt the financial trade instructions 114 or change the number of the smaller transaction order depending on the behavior of the markets or if there is any suspicious activity. The multiple servers 106, 107, 108, 109 may also have the capability to change the transaction execution time to an execution time earlier or later than the previous execution time set by the trading server 101. Changing the number of the smaller transaction orders 120-123 and the transaction execution time 116 may also be done by sending new financial trade instructions from the trading server 101 to update the previous financial trade instructions stored at the multiple servers 106, 107, 108, 109 instead of performing changes at the multiple servers 106, 107, 108, 109.

When the time of each of high accuracy clocks 110, 111, 112, 113 reaches the transaction execution time 116, each server 106, 107, 108, 109 submits its smaller transaction order 120-123 to its corresponding exchange 102, 103, 104, 105 (step 206, FIG. 5). Since the time difference between each high accuracy clock 110, 111, 112, 113 is small, i.e., with differences of nanoseconds, all the submissions of orders occur virtually simultaneously. As such, high frequency traders will not be able to take advantage of different time delays and latencies of the transmission lines and exchanges to predict the non-high frequency trader's purchasing behavior and purchase the financial instruments that the non-high frequency trader wants to buy at the other or slower exchanges in advance.

After each co-located server 106-109 submits its smaller transaction order 120-123 to its corresponding exchange 102-105 (step 206), the trading server 101 can receive a notification 131-134 from each server 106-109 that each smaller transaction order 120-123 has been successfully submitted at the time specified by the transaction execution time 116 (step 207). Additionally, the co-located servers 106-109 can include in the notifications 131-134 an indication that the smaller transaction orders 120-123 have been executed on the respective exchanges. As understood from the present description, each of the co-located servers 106-109 is associated with and connected to only one of the financial exchanges 102-105. Each of the co-located servers 106-109 will only submit one of the smaller transaction orders 120-123 to the exchange to which it is connected, and on which the submitted transaction order is intended to be executed.

Figure 6:
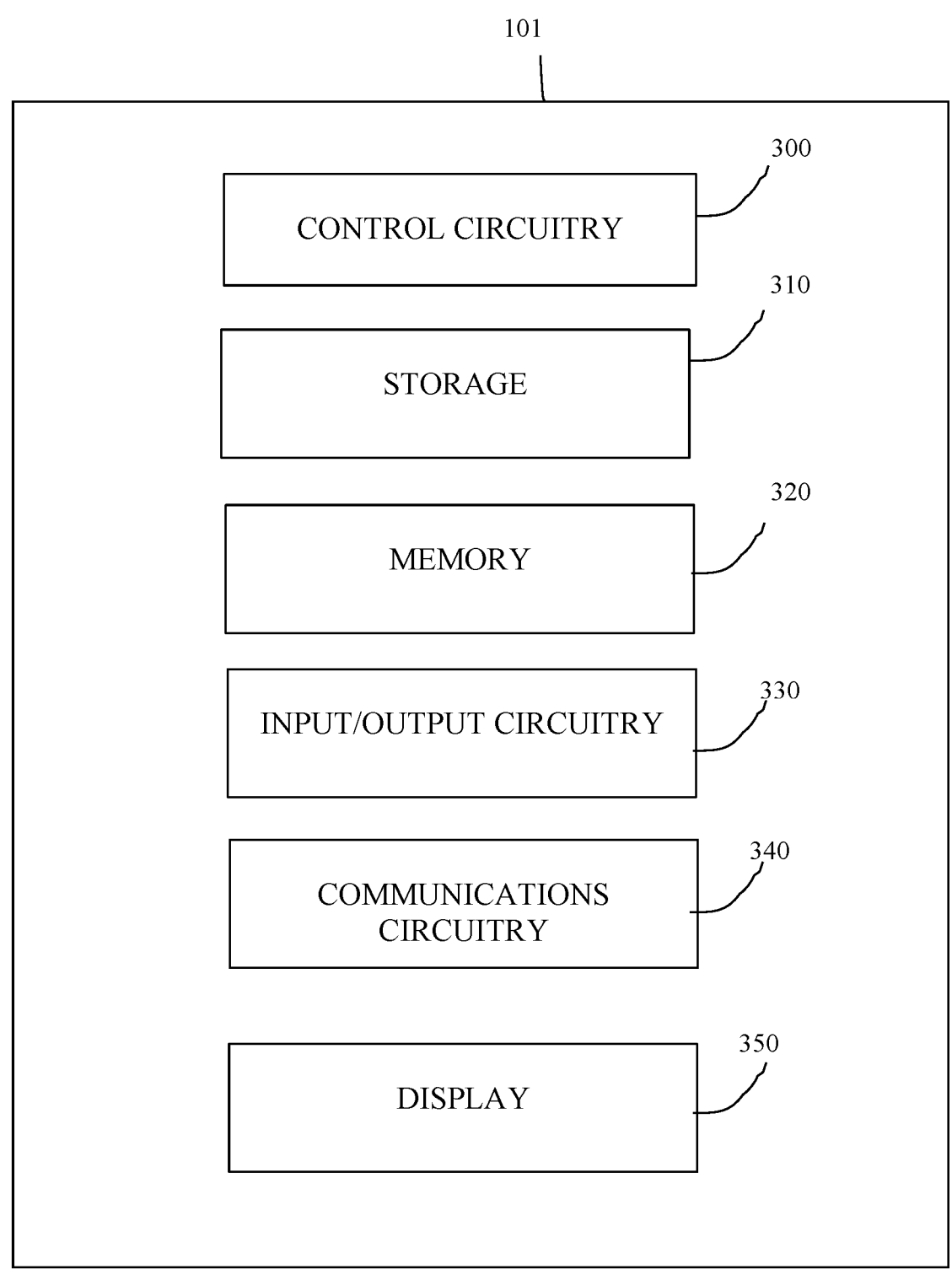
FIG. 6 depicts one embodiment of a server.

Referring to FIG. 6, one embodiment of the trading server 101 is illustrated. As appreciated by those skilled the art, the trading server 101 can take many forms capable of operating the present invention. Furthermore, as appreciated by those skilled in the art, each of the co-located servers 106-109 can have a similar construction as described herein with respect to the trading server 101. Additionally, as also appreciated by those skilled in the art, trading server 101 can actually be comprised of several servers performing interconnected and distributed functions.

In a preferred embodiment, the trading server 101 is a computer system comprising control circuitry 300, storage 310, memory 320, input/output ("I/O") circuitry 330, communications circuitry 340, and a display 350. As appreciated by those skilled in the art, the trading server 101 can include other components not combined or included in those shown in this Figure, e.g., a power supply, an input mechanism, etc.

Control circuitry 300 can include any processing circuitry or processor operative to control the operations and performance of the trading server 101. For example, control circuitry 300 can be used to run operating system applications, firmware applications, or other applications used to communicate with users, customer systems and the multiple co-located servers 106-109. Control circuitry 300 can drive the display 350 and process inputs received from a user interface, e.g., the display 350 if it is a touch screen.

Storage 310 can include, for example, one or more tangible computer storage devices including a hard-drive, solid state drive, flash memory, permanent memory such as ROM, magnetic, optical, semiconductor, or any other suitable type of storage component, or any combination thereof. Storage 310 can store, for example, application data for implementing functions on the trading server 101, authentication information such as libraries of data associated with authorized users, transaction data such as transaction orders and transaction execution time, wireless connection data that can enable the trading server 101 to establish a wireless connection, and any other suitable data or any combination thereof. The instructions for implementing the functions of the present invention may, as non-limiting examples, comprise non transient software and/or scripts stored in the computer-readable media 310.

Memory 320 can include cache memory, semi-permanent memory such as RAM, and/or one or more types of memory used for temporarily storing data. In some embodiments, memory 320 can also be used for storing data to operate trading server applications, or any other data from storage 310. In some embodiments, memory 320 and storage 310 can be combined as a single storage medium.

I/O circuitry 330 can be operative to convert and encode/ decode, analog signals and other signals into digital data. In some embodiments, I/O circuitry 330 can also convert digital data into another type of signal, and vice-versa. For example, I/O circuitry 330 can receive and convert physical contact inputs from a multi-touch screen such as display 350, physical movements from a mouse or sensor, analog audio signals from a microphone, or other input. The digital data can be provided to and received from control circuitry 300, storage 310, and memory 320, or any other component of the trading server 101. Although I/O circuitry 330 is illustrated in this Figure as a single component of the trading server 101, several instances of I/O circuitry 330 can be included in the trading server 101.

The trading server 101 can include any suitable interface or component for allowing a user to provide inputs to I/O circuitry 330. For example, the trading server 101 can include a button, keypad, dial, a click wheel, or a touch screen, e.g., display 350.

Display 350 includes the display and display circuitry for providing a display visible to the user. For example, the display circuitry can include a screen, e.g., an LCD screen, that is incorporated in the trading server 101. In some embodiments, the display circuitry can include a coder/decoder (Codec) to convert digital data into analog signals and vice versa. For example, the display circuitry or other appropriate circuitry within the trading server 101 can include Codecs necessary to process the transaction orders and the transaction execution time, or any other suitable type of Codec.

The display circuitry also can include display driver circuitry, circuitry for driving display drivers, or both. The display circuitry can be operative to display content, e.g., application screens for applications implemented on the trading server 101, information regarding ongoing communications operations, information regarding incoming communications requests, or device operation screens, under the direction of control circuitry 300. Alternatively, the display circuitry can be operative to provide instructions to a remote display.

Communications circuitry 340 can include any suitable communications circuitry operative to connect to a communications network and to transmit communications, e.g., data from the trading server 101 to other devices, servers 106-109, or computers within the communications network. Communications circuitry 340 can be operative to interface with a communications network using any suitable communications protocol such as Wi-Fi, 802.11, Bluetooth, radio frequency systems such as 900 MHz, 1.4 GHZ, and 5.6 GHz communication systems, infrared, GSM, GSM plus EDGE, CDMA, quadband, and other cellular protocols, VOIP, or any other suitable protocol. The communications network may also be established by using wires such as an optical fiber or Ethernet cable.

The trading server 101 can include one or more instances of communications circuitry 340 for simultaneously performing several communications operations using different communications networks, although only one instance of communications circuitry 340 is shown in FIG. 6 to avoid overcomplicating the drawing. For example, the trading server 101 can include a first instance of communications circuitry 340 for communicating over a cellular network, a second instance of communications circuitry 340 for communicating over Wi-Fi or using Bluetooth, and a third instance of communications circuitry 340 for communicating over an optical fiber. In some embodiments, the same instance of communications circuitry 340 can be operative to provide for communications over several communications networks.

In some embodiments, the trading server 101 can further be coupled to a host device such as an application data control server for data transfers, synchronizing the communications device, software or firmware updates, providing performance information to a remote source, e.g., providing trade execution characteristics to a remote server, or performing any other suitable operation that can require the trading server 101 to be coupled to a host device. Several trading servers 101 can be coupled to a single host device using the host device as a server. Alternatively or additionally, the trading server 101 can be coupled to several host devices, e.g., for each of the plurality of the host devices to serve as a backup for data stored in the trading server 101.

Figure 1:
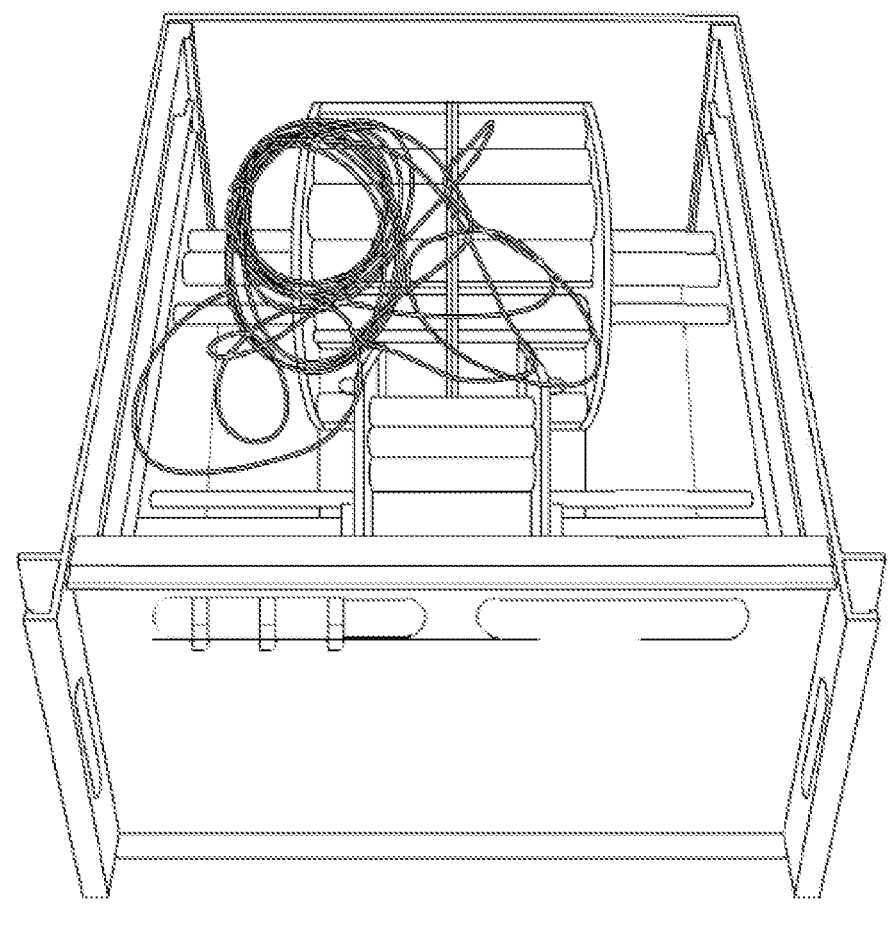
FIG. 1 illustrates a technique creating delay to the exchanges by utilizing a coiled fiber-optic cable.

The above financial trading system and trading method provide a much simpler and more cost efficient way to achieve accurate and repeatable synchronized trades compared to the prior art. Compared to the technique illustrated in FIG. 1, the present invention does not require installing a separate fiber-optic cable compartment at a trader site that would consume additional space. A substantial amount of space would be consumed when the trader 101 is one that trades heavily with numerous exchanges. The compartment would necessarily also get larger if the exchange is one that possess significantly less delay and latency with respect to other exchanges. Moreover, as technology advances rapidly, it is inevitable that the exchanges will constantly update their hardware and software to make their systems more robust. As such, the delays to the exchanges and latencies of communication links and exchanges will continuously change, requiring the trader to adjust the length of the fiber-optic cable frequently. The present invention eliminates all the above problems. Further, the delay induced by the coiled cable is a fixed amount, determined by the average delay time experienced to a particular exchange. Thus, the delay induced by the coil is only a prediction of what the actual delay will be. However, when an actual trade instructions is transmitted, the communication network or link to which the coil is coupled may be experiencing congestion or a lack of traffic, or any other technical situation causing more or less delay than predicted. In either of these cases, the transmitted instruction may arrive at the destination exchange at a significantly different time than predicted. This variability in the reception time at the exchanges can defeat the purpose of the coiled cable, and high frequency traders may still detect the trades and act before the non-high frequency trader's instructions arrive at the other exchanges. The present invention solves this variability problem experienced by the prior art.

Figure 2A:
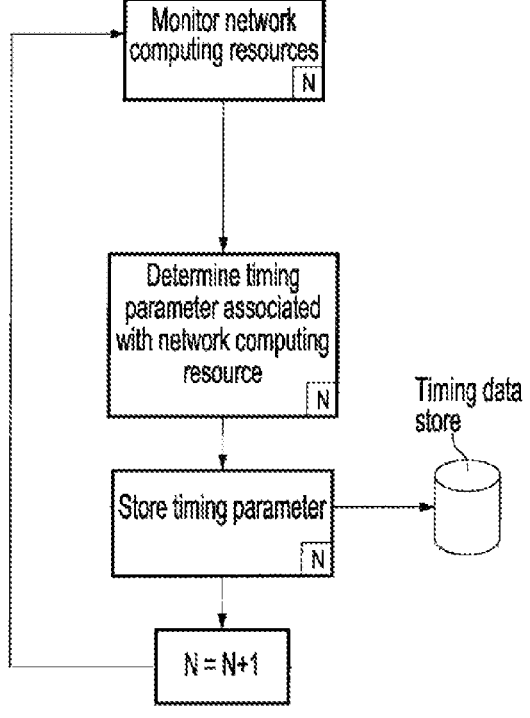
FIGS. 2A and 2B illustrate a technique determining the time delays to the exchanges and the latencies of the communication links and the exchanges and using the determined time delays and latencies to simultaneously deliver orders to the exchanges.
Figure 2B:
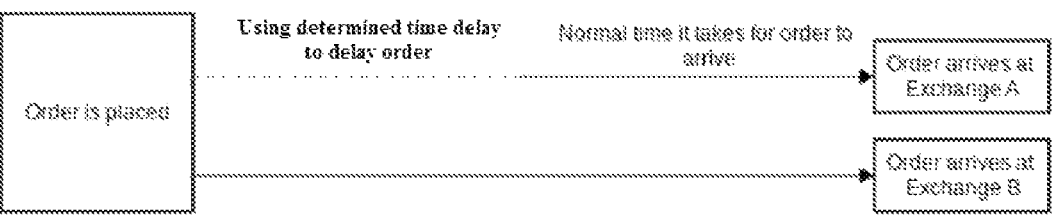

Compared to the technique illustrated in FIG. 2, the present invention does not require complicated hardware and software to calculate the time delays to the exchanges and the latencies of the communication links and the exchanges. Those time delays and latencies are irrelevant in trading the financial instruments in the present invention, as the transaction execution time of the present invention is solely determined by the trading entity via the trading server 101. Since the present invention does not include a step of calculating time delays and latencies, the trade process implemented in the present invention is much simpler and much more accurate. Moreover, without intentionally delaying the transaction orders to the exchanges based on the predicted time delays and latencies, the transaction orders can arrive at the exchanges more quickly and are less prone to error or corruption.

Figure 3:
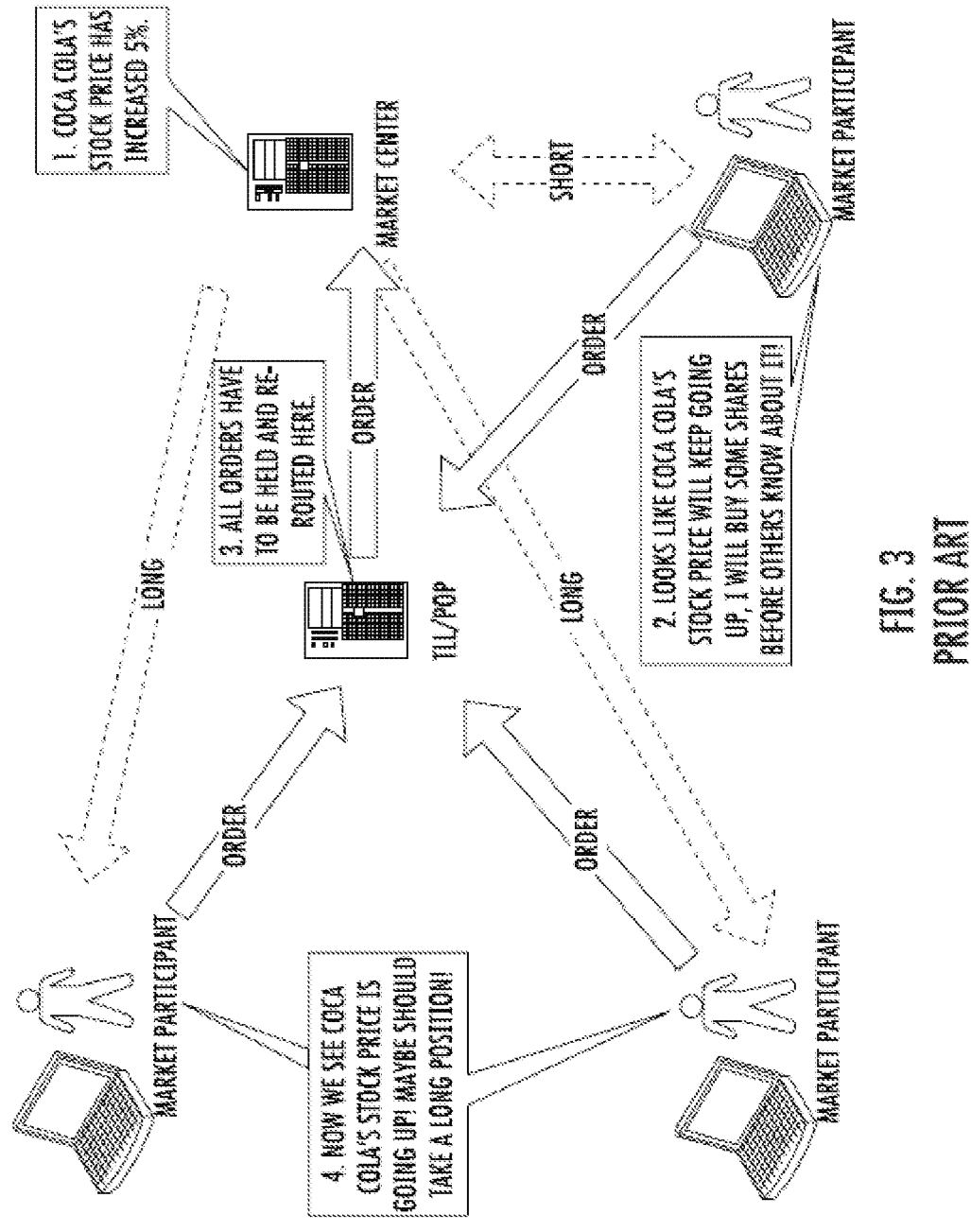
FIG. 3 illustrates a technique creating delay to the exchanges by employing a management infrastructure that comprises a server and a transmission medium.

Compared to the technique illustrated in FIG. 3, the present invention utilizes multiple uncoupled servers rather than only one single server. If one of the servers malfunctions, the transaction orders transmitted to the other servers can still be fulfilled. The present invention also does not require any additional medium to create time delays that would otherwise incur extra cost to the trading system. The present invention provides direct communications between the trading server 101 and the co-located servers 106-109, and between the co-located servers 106-109 and the exchanges 102-105 so that the transmissions are less problematic.

Importantly, none of the above prior art techniques can handle the delay produced by network congestion, data rerouting caused by outage, or other similar network issues. Since the length of this delay is uncertain as it depends on the seriousness of the network issue, and is added to the inherent delays and latencies of the transmission lines and exchanges, any problems occurring on the network may lead the financial instrument orders to arrive at the exchanges at significantly different times even if the inherent delays and latencies predicted by the prior art techniques are very accurate. As such, network issues can still render the above prior art techniques ineffective against high frequency traders. The present invention eliminates this problem by instructing all the financial instrument orders to be submitted at a specific time. The present invention therefore ensures that all the orders are simultaneously submitted, regardless of network conditions.

Although the above system and method is directed toward executing synchronized trading in the financial field, they are not so limited and may be adopted in any fields or any computer systems that require synchronized execution. Instead of a trading server storing a transaction order, it may simply be an ordinary server or a primary server that can store a primary message. The primary server, like the trading server, may generate a plurality of secondary messages derived from the primary message, with each secondary message specifying a task to be executed by another server to which the secondary message is transmitted. This primary server, like the trading server, may also determine an execution time at which the plurality of secondary messages are to be executed as described above. This primary server, like the trading server, may further generate a plurality of instructions, with each instruction containing a respective one of the secondary messages and the execution time. This primary server then can transmit each instruction to a respective one of a plurality of geographically dispersed secondary servers. These geographically dispersed secondary servers are servers hosted at different geographical locations or different GPS locations (i.e., different latitude and longitude) that have different communication link length to the primary server. These geographically dispersed secondary servers are similar to the co-located servers above because the financial exchanges at which the co-located servers are co-located are also hosted at different geographical locations or different GPS locations. These secondary servers, however, may not need to be servers used in conjunction with financial exchanges. These secondary servers may similarly have the capabilities to store the secondary messages and the execution time contained in the transmitted instructions, to determine a current time, to compare the determined current time with the execution time, to simultaneously execute the secondary messages stored at those secondary servers or submit the secondary messages from those secondary servers to another set of servers, and to send notifications after those secondary messages have been successfully executed or submitted.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the methods themselves, no particular order to steps or stages of methods described in this disclosure, including the Figures, is intended or implied. In many cases the order of method steps may be varied without changing the purpose, effect, or import of the methods described. The scope of the claims is to be defined solely by the appended claims, giving due consideration to the doctrine of equivalents and related doctrines.

What is claimed is:

1. A computer-based method configured and adapted to execute synchronized messages, the method comprising acts of:

storing, by a primary server, a primary message;

generating, by the primary server, a plurality of secondary messages, wherein the secondary messages are derived from the primary message;

determining, by the primary server, an execution time at which the plurality of secondary messages are to be acted on;

generating, by the primary server, a plurality of instructions, each of the plurality of instructions containing a respective one of the secondary messages and the execution time;

transmitting, by the primary server, a respective one of the plurality of instructions to a respective one of a plurality of geographically dispersed secondary servers;

storing, by each of the plurality of geographically dispersed secondary servers, the respective secondary message and the execution time contained in the transmitted instruction;

determining, by each of the plurality of geographically dispersed secondary servers, a current time; and comparing, by each of the plurality of geographically dispersed secondary servers, the determined current time and the stored execution time, and when the determined current time is equal to the stored transaction execution time, each of the plurality of geographically dispersed secondary servers performing an action with respect to the secondary message.

2. The method according to claim 1, wherein the act of storing the plurality of secondary messages by the primary server further comprises storing a task to be executed by each of the plurality of geographically dispersed secondary servers.

3. The method according to claim 1, wherein the act of determining an execution time at which the plurality of secondary messages are to be acted on by the plurality of geographically dispersed secondary servers further comprises determining a specific time and determining a small amount of time to be added to the determined specific time.

4. The method according to claim 3, wherein the act of determining the small amount of time to be added to the determined specific time further comprises determining the small amount of time in microseconds.

5. The method according to claim 1, further comprising receiving, by the primary server, a notification that a respective one of the secondary messages has been acted on by a respective one of the plurality of geographically dispersed secondary servers.

6. The method of claim 1, wherein the act of determining a current time by each of the plurality of geographically dispersed secondary servers comprises determining a current time from a clock, including an atomic clock, an optical clock, a quantum clock, or a GPS clock.

7. The method of claim 1, wherein each of the plurality of geographically dispersed secondary servers includes its own clock, the method further comprising periodically synchronizing the clocks used by the plurality of geographically dispersed secondary servers with GPS satellites or terrestrial sources that carry National Institute of Standards and Technology atomic clock time, wherein each of the clocks checks the accuracy of the time it is keeping and makes adjustments as necessary.

8. The method of claim 1, wherein the action with respect to the secondary message performed by each of the plurality geographically dispersed secondary servers further comprises forwarding the secondary message to respective tertiary servers co-located with respective ones of the geographically dispersed secondary servers.

9. The method of claim 8 wherein the act of forwarding the secondary message further comprises transmitting the secondary message from a respective geographically dispersed secondary server to the respective tertiary server by a wired connection.

10. The method of claim 1, wherein the primary and geographically dispersed secondary servers are commonly controlled.

11. A computer-based system for executing synchronized messages in a plurality of geographically dispersed servers:
    control circuitry that controls operation of the system;
    a plurality of co-located secondary servers with each being co-located at a respective one of the plurality of the geographically dispersed servers;
    a primary server connected to the plurality of co-located secondary servers; and
    wherein the control circuitry is operable to:
        store, by the primary server, a primary message;
        generate, by the primary server, a plurality of secondary messages, where the plurality of secondary messages are derived from the primary message;
        determine, by the primary server, an execution time at which the plurality of secondary messages are to be acted on;
        generate, by the primary server, a plurality of instructions, each of the plurality of instructions containing a respective one of the plurality of secondary messages and the execution time;
        transmit, by the primary server, the plurality of instructions, respectively, to a respective one of the plurality of co-located secondary servers;
        store, by each of the plurality of co-located secondary servers, the respective secondary messages and the execution time contained in the transmitted instruction;
        determine, by each of the plurality of co-located secondary servers, a current time; and
        compare, by each of the plurality of co-located secondary servers, the determined current time and the stored execution time, and when the determined current time is equal to the stored execution time, each of the plurality of co-located secondary servers submits the stored secondary message to the respective geographically dispersed server where it is co-located.

12. The system according to claim 11 further comprising a clock in each of the plurality of co-located secondary servers, wherein each of the clocks in the plurality of co-located secondary servers comprises an atomic clock, an optical clock, a quantum clock, or a GPS clock.

13. The system according to claim 12, wherein the clock in each of the plurality of co-located secondary servers is not continuously connected to GPS satellites or terrestrial sources that carry National Institute of Standards and Technology atomic clock time, and wherein each clock and has a capability to synchronize with the GPS satellites or the terrestrial sources for the clock to check the accuracy of the time it is keeping and make adjustments as necessary.

14. The system according to claim 11, wherein the determined current time is measurable to microsecond accuracy.

15. The system according to claim 11 wherein the determined execution time further comprises a determined specific time and a determined small amount of time to be added to the determined specific time.

16. The system according to claim 11, wherein the control circuitry is further operable to receive, by the primary server, a notification from at least one of the plurality of co-located secondary servers that a respective one of the plurality of secondary messages has been submitted to a respective one of the plurality of geographically dispersed servers.

17. The system according to claim 11, wherein the primary and the plurality of co-located secondary servers are commonly controlled.

18. A computer-based method configured and adapted to execute synchronized messages that includes a plurality of secondary servers co-located, respectively, at a plurality of geographically dispersed severs, the method comprising the acts, at each co-located secondary server, of:
    receiving, from a primary server, a secondary message, wherein the secondary messages received by the respective co-located secondary servers are related to a single message in the primary server;
    receiving an execution time from the primary server;
    determining a current time; and
    comparing, the determined current time and the received execution time, and when the determined current time is equal to the received execution time, submitting the received secondary message to a respective one of the plurality geographically dispersed servers at which the co-located secondary server is co-located.

19. The method according to claim 18, wherein the secondary message and the execution time are received in a single instruction by each of the plurality of co-located secondary servers.

20. The method according to claim 18, wherein the act of determining a current time by each of the plurality of co-located secondary servers comprises determining a current time from a clock including an atomic clock, an optical clock, a quantum clock, or a GPS clock.

21. The method according to claim 18, wherein each of the co-located secondary servers includes its own clock, the method further comprising periodically synchronizing the clocks used by the co-located secondary servers with GPS satellites or the terrestrial sources that carry National Institute of Standards and Technology atomic clock time, wherein each of the clocks check the accuracy of the time it is keeping with microsecond accuracy and makes adjustments as necessary.

22. The method of claim 18, wherein the primary and co-located secondary servers are commonly controlled.

23. A computer-based method configured and adapted to execute synchronized messages, the method executable on a primary server and comprising the acts of:
    storing, in a memory of the primary server, a primary message;
    generating, by the primary server, a plurality of secondary messages, wherein the secondary messages are derived from the primary message;
    determining, by the primary server, an execution time at which the plurality of messages are to be submitted to a plurality of geographically dispersed servers for execution;
    generating, by the primary server, a plurality of instructions, each of the plurality of instructions containing a respective one of the secondary messages and the execution time;
    transmitting, by the primary server, each of the plurality of instructions, respectively, to a respective one of a plurality of co-located secondary servers, the plurality of co-located secondary servers being respectively co-located at a respective one of the geographically dispersed servers where the respective secondary messages are to be executed; and receiving, by the primary server, a notification that at least 5 of the respective secondary messages has been submitted to a respective one of the plurality of geographically dispersed servers.

24. The method according to claim 23, wherein the act of determining an execution time at which the plurality of 10 secondary messages are to be submitted for execution further comprises determining a specific time and determining a small amount of time to be added to the determined specific time, wherein the small amount of time is measured in microseconds. 15

25. The method according to claim 23, wherein the act of determining a current time by each of the plurality of co-located secondary servers further comprises determining a current time from a clock including an atomic clock, an optical clock, a quantum clock, or a GPS clock, wherein 20 each of the co-located secondary servers has its own clock, the method further comprising periodically synchronizing the clocks used by the co-located secondary servers with GPS satellites or terrestrial sources that carry National Institute of Standards and Technology atomic clock time, 25 wherein each of the clocks check the accuracy of the time it is keeping with microsecond accuracy and makes adjustments as necessary.

26. The method of claim 23, wherein the primary and co-located secondary servers are commonly controlled. 30

* * * * *